(12) United States Patent
Laible

(10) Patent No.: US 10,889,486 B1
(45) Date of Patent: Jan. 12, 2021

(54) DISPENSING AND/OR DOSING SYSTEM

(71) Applicant: Rodney Laible, Omaha, NE (US)

(72) Inventor: Rodney Laible, Omaha, NE (US)

(*) Notice: Subject to any disclaimer, the term of this patent is extended or adjusted under 35 U.S.C. 154(b) by 0 days.

(21) Appl. No.: 17/009,332

(22) Filed: Sep. 1, 2020

(51) Int. Cl.
*B67D 3/00* (2006.01)
*G01F 11/32* (2006.01)

(52) U.S. Cl.
CPC .......... *B67D 3/0045* (2013.01); *B67D 3/0035* (2013.01); *G01F 11/32* (2013.01)

(58) Field of Classification Search
CPC ...... B67D 3/0045; B67D 3/0035; G01F 11/32
See application file for complete search history.

(56) References Cited

U.S. PATENT DOCUMENTS

| | | | | |
|---|---|---|---|---|
| 5,224,528 A | * | 7/1993 | Helmut | B67D 3/0041 141/1 |
| 6,142,345 A | * | 11/2000 | Laible | B67D 7/0277 222/189.1 |
| 6,923,345 B1 | * | 8/2005 | Laible | B67D 7/0294 222/185.1 |
| 6,945,432 B2 | | 9/2005 | Laible | |
| 6,945,433 B2 | | 9/2005 | Laible | |
| 6,986,443 B2 | | 1/2006 | Laible | |
| 7,614,528 B2 | * | 11/2009 | Jeong | B67D 3/02 222/438 |
| 7,832,599 B2 | | 11/2010 | Laible | |
| 8,066,157 B2 | | 11/2011 | Laible | |
| 8,220,665 B2 | | 7/2012 | Laible | |
| 9,517,925 B2 | * | 12/2016 | Imai | B67D 7/0283 |
| 2004/0112462 A1 | * | 6/2004 | Kelsey | G01F 11/32 141/346 |
| 2004/0134941 A1 | * | 7/2004 | Laible | B67D 7/0294 222/518 |
| 2004/0164104 A1 | * | 8/2004 | Laible | B67D 7/0294 222/518 |
| 2004/0206786 A1 | * | 10/2004 | Laible | B67D 7/0294 222/507 |
| 2009/0026229 A1 | * | 1/2009 | Laible | G01F 11/028 1/28 |
| 2009/0159618 A1 | * | 6/2009 | Laible | B67D 3/0041 222/442 |
| 2009/0159619 A1 | * | 6/2009 | Laible | B67D 3/0035 222/442 |
| 2009/0230147 A1 | * | 9/2009 | Chapin | B67D 3/0035 222/132 |

* cited by examiner

*Primary Examiner* — Jeremy Carroll
(74) *Attorney, Agent, or Firm* — Dennis L. Thomte; Thomte Patent Law Office LLC

(57) ABSTRACT

A dispensing and/or dosing system for use with an inverted liquid container such as a bottle or the like for dispensing and/or dosing liquid from the bottle. The system includes an improved valve which replaces the throat plug assembly of Applicant's earlier patents. The system is entirely recyclable and is durable in use.

7 Claims, 16 Drawing Sheets

DISPENSING AND/OR DOSING SYSTEM

BACKGROUND OF THE INVENTION

Field of the Invention

The inventions disclosed in Applicant's earlier patents relate to dispensing and/or dosing systems. The instant invention also relates to a dispensing and/or dosing system with the instant invention having an overmolded tricuspid valve which is positioned in the throat of the liquid container rather than a throat plug assembly.

Description of the Related Art

Applicant has received U.S. Pat. Nos. 6,986,443; 6,945,432; 6,945,433; 7,832,599; 8,066,157; 8,220,665 relating to dispensing and/or dosing systems which have been commercially successful. In most of Applicant's earlier patents, the dispensing systems and/or dosing systems included throat plug assemblies which were inserted into the throat of the bottle to close the same. Although the throat plug assemblies in Applicant's earlier patents functioned extremely well, they had several components which added to the cost of manufacturing the same. Further, some of Applicant's dispensing and/or dosing systems were not entirely recyclable. Additionally, some of Applicant's systems included metal springs which corroded when brought into contact with certain chemicals being dispensed and/or dosed.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

This invention relates to a dispensing and/or dosing system for use with inverted liquid containers, such as a bottle or the like, having upper and lower ends. The lower end of the container has a hollow throat extending downwardly therefrom with the exterior surface of the throat being threaded.

A normally closed and overmolded tricuspid valve is inserted into the throat of the container which prevents liquid from escaping from the container during shipment, storage, etc. The invention also involves a mounting fixture which includes a vertically disposed mounting plate which is secured to a wall, cabinet, or other supporting surface. The mounting fixture also includes a shelf which extends horizontally from the mounting plate and which has a circular opening formed therein.

A mounting ring is mounted on the shelf and has an upper side and a lower side. The upper side of the mounting ring has a pair of upstanding, spaced-apart ring-shaped inner and outer walls which have a bottom wall extending therebetween to define a generally U-shaped channel. The bottom wall of the U-shaped channel has a plurality of radially spaced-apart openings formed therein some of which are screw openings and some of which are vent openings. The bottom wall of the U-shaped channel also has a plurality of radially spaced-apart screw posts extending upwardly therefrom. A central opening is formed in the mounting ring at the inner side of the inner wall thereof. The lower side of the mounting ring has a circular wall which extends downwardly therefrom and outwardly of the openings formed in the bottom wall. The lower side of the mounting ring has an annular wall which extends downwardly therefrom, the center of which is in communication with the opening in the inner wall thereof. A horizontally and partially overmolded vent ring is mounted on the upper side of the mounting ring. The vent ring has an upper side and a lower side. The vent ring includes a horizontally disposed and ring-shaped wall having a central opening formed therein. The horizontally disposed ring-shaped wall of the vent ring has a plurality of radially spaced-apart vent openings formed therein. The horizontally disposed and ring-shaped wall of the vent ring also has a plurality of radially spaced-apart screw openings formed therein which are configured to receive screws extending downwardly thereinto. The vent ring further includes an internally threaded upstanding ring-shaped wall which extends upwardly from the horizontally disposed and ring-shaped wall. The interior of the internally threaded upstanding ring-wall is in communication with the central openings in the horizontally disposed and ring-shaped wall.

A hollow, generally cylindrical-shaped accumulator is provided which has an open upper end and a bottom wall defining a liquid compartment therein. The upper end of the accumulator is attached to the mounting ring whereby the open upper end of the accumulator is in fluid communication with the interior of the ring-shaped wall of the mounting ring. The bottom wall of the accumulator has a central first valve seat formed therein.

A dosing bowl or cup is also provided and has a dosing compartment formed therein. The upper end of the dosing bowl is threadably secured to the lower end of the accumulator so that the dosing compartment is in communication with the first valve seat in the accumulator. The lower end of the dosing bowl has a discharge opening with a second valve seat formed therein. A dispensing actuator is selectively vertically movably mounted on the lower end of the dosing bowl and which is movable between upper and lower positions with respect thereto. An elongated actuator rod, having upper and lower ends, is also provided. The lower end of the actuator rod is secured to the actuator for vertical movement therewith. The actuator rod extends upwardly from the actuator through the second valve seat in the dosing bowl, through the first valve seat in the accumulator and upwardly through the accumulator and into the internally threaded ring-shaped wall of the mounting ring and through the vent ring. The actuator rod has vertically spaced-apart upper and lower valve members mounted therein. The upper end of the actuator rod has a pointed lance mounted thereon. When the actuator rod is in the lower position, the lower valve thereof is seated upon the second valve seat to close the same. At that time, the upper valve thereof is not seated upon the first valve seat.

The container will be inverted with the internally threaded throat of the container being screwed onto the ring-shaped member of the mounting ring assembly. The tricuspid valve will be closed at that time. When it is desired to dispense or dose liquid from the container, the actuator is moved upwardly from its lower position to its upper position. When the actuator rod is moved to its upper position, the first valve seat will be closed by the upper valve on the actuator rod. The second valve seat will be open at that time. When the actuator rod is moved to its upper position, the pointed lance on the upper end of the actuator rod will pierce the tricuspid valve to open the same which allows liquid from the container to pass downwardly into the accumulator which remains in the accumulator since the first valve seat is closed by the upper valve.

When the first accumulator is filled, the actuator is then moved from its upper position to its lower position which (1) withdraws the pointed lance form the tricuspid valve then closes automatically; (2) the upper valve on the actuator rod moves out of engagement with the first valve seat thereby permitting liquid in the accumulator to flow through the first valve seat downwardly into the dosing bowl and which remains therein since the lower valve on the actuator rod has been moved to a closed position with respect to the second valve seat. At that time, the anti-drip valve will be closed.

When it is desired to dose or discharge the liquid in the dosing bowl, the operator will place a bucket, pail, etc., below the discharge end of the actuator. The actuator is then moved from its lower position to its upper position which open the lower valve, opens the anti-drip valve and closes the upper valve so that the liquid may drain from the dosing bowl and so that the lance pierces the tricuspid valve so that liquid may gravity flow downwardly in the accumulator for the next cycle.

A principal object of the invention is to provide an improved dispensing and/or dosing system.

A further object of the invention is to provide an improved dispensing and/or dosing system which includes improved venting means to ensure efficient and accurate dispensing or dosing of liquid from an inverted container.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
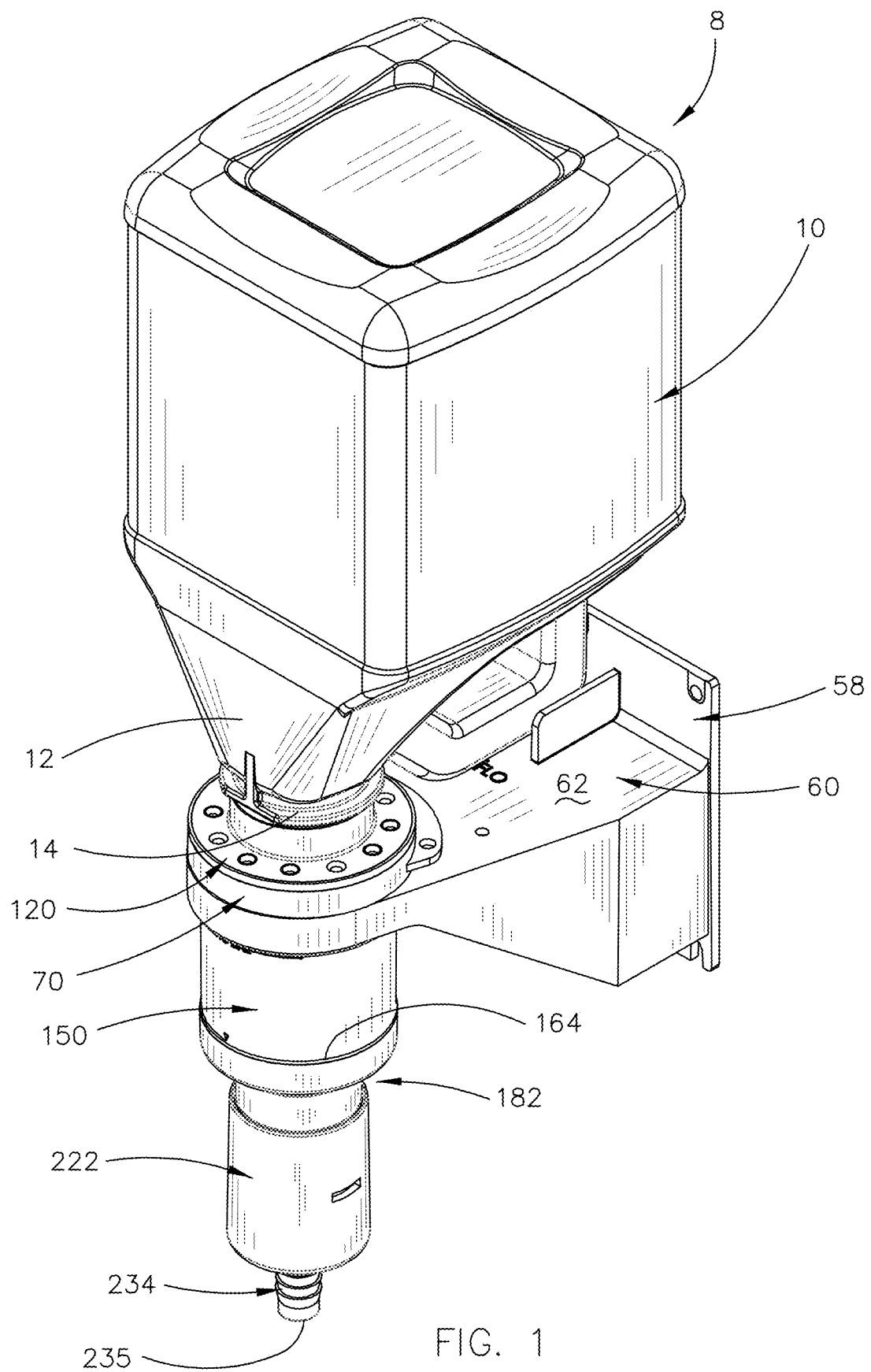
FIG. 1 is a front perspective view of the dispensing and/or dosing system of this invention.
Figure 1A:
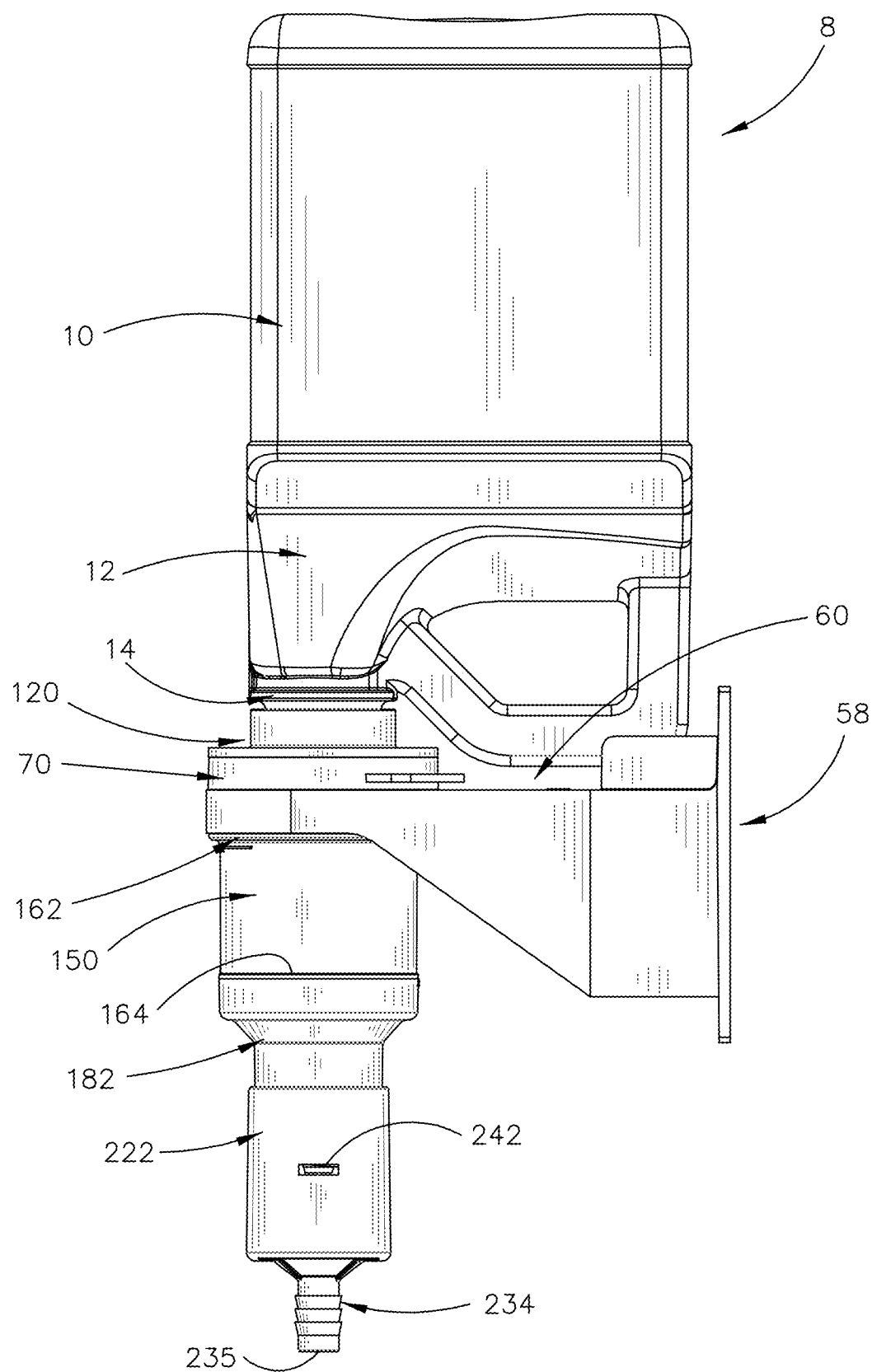
FIG. 1A is a side view of the dispensing and/or dosing system of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant hereby incorporates the disclosures of U.S. Pat. Nos. 7,832,599 and 7,841,492 by reference thereto to complete this disclosure if necessary.

The numeral 8 refers to the dispensing and/or dosing system of this invention. The numeral 10 refers to a conventional container such as a bottle or the like which is used for transporting, storing and dispensing liquids such as chemicals. The drawings illustrate the container in an inverted dispensing system. Normally, the container would be transported or stored in an upright position with a conventional cap closing the upper end thereof. The container 10 includes a tapered portion 12 and an externally threaded throat portion 14 thereon.

The numeral 16 refers to an overmolded tricuspid valve which may be press-fitted into the throat portion 16 of its upright container 10 after the liquid has been placed into the container at the factory. The valve 16 is normally closed and will prevent liquid from flowing outwardly from the container during transportation and/or storage of the container. The valve 16 could also be inserted into the throat portion 14 of the upright container 10 just prior to the container being inverted into the dispensing position shown in the drawings.

Valve 16 will be described in detail prior to the container 10 being inverted. Valve 16 will be described as having an upper end 18 and a lower end 19.

Valve 16 includes a hollow tubular substrate member 20 having an upper cylindrical wall 22 with an upper end 24 and a lower end 26. An annular lip or flange 28 extends outwardly from the upper end 24 of wall 22. An annular shoulder 30 extends inwardly from the lower end 26 of wall 22. Substrate portion 20 includes a lower cylindrical wall 32, having an upper end 34 and a lower end 36, which extends downwardly from the inner end of shoulder 30. As seen, upper cylindrical wall 32 has a diameter which is less than the diameter of upper cylindrical wall 22 thereby creating a recessed portion 38 at the inner side of upper cylindrical wall 22. The substrate portion 20 may be molded from any resin that would act as a structure support such as polypropylene, polyethylene or PVDF.

The numeral 40 refers to the overmolded portion of valve 16. Overmolded portion 40 includes a cylindrical wall 42 which embraces the outer side of upper cylindrical wall 22. Overmolded portion 40 also includes a portion 44 which embraces lip 28. Overmolded portion 40 further includes a cylindrical wall 46 which extends downwardly from the inner end of portion 44. As seen, the lower end of wall 46 is positioned in the recessed portion 38 at the inner side of upper cylindrical wall 22. Wall 46 has an upper end 48 and a lower end 49.

Upper cylindrical wall 22 has a plurality of radially spaced-apart openings 50 formed therein so that overmolding passes from wall 46, through opening 50 and into wall 42, to securely attach the overmolded portion 40 to the substrate member 20.

The overmolded portion 40 includes three flexible cuspids 52 which are molded together. Each of the cuspids 52 is generally triangular in plan view. Each of the cuspids 52 has a semi-circular outer end 53 which is molded to the inside of wall 46. The outer end 53 of each of the cuspids 52 extends downwardly along wall 46. Each of the cuspids 52 have a horizontally disposed lower end 54 which extends inwardly from the lower end of the wall 46. Each of the cuspids 52 have a side edge 56 which extends downwardly from the upper end of wall 46 to lower end 54 of the cuspid 52. The side edges 56 of the cuspids 52 are molded together. The lower ends 54 of the cuspids 52 are molded together. The overmolded resin could be any resin that is soft enough to create a seal and form a valve such as metallocene, TPV, TPU or TPE.

Thus, when installed in the throat 12 of an upright container 10, the valve 16 prevents the flow of liquid outwardly from the container 10. When the container 10 is inverted as seen in FIG. 1, the valve 16 prevents the downward flow of liquid from the container 10. When sufficient tearing force is applied to the underside of the cuspids 52, the cuspids 52 will tear open to permit liquid to flow downwardly through the valve 16 as long piercing force is applied thereto. When the piercing force is withdrawn, the side edges 56 of the cuspids 52 will join together to prevent liquid from passing downwardly therethrough. The dosing action will be described in detail hereinafter.

Figure 2:
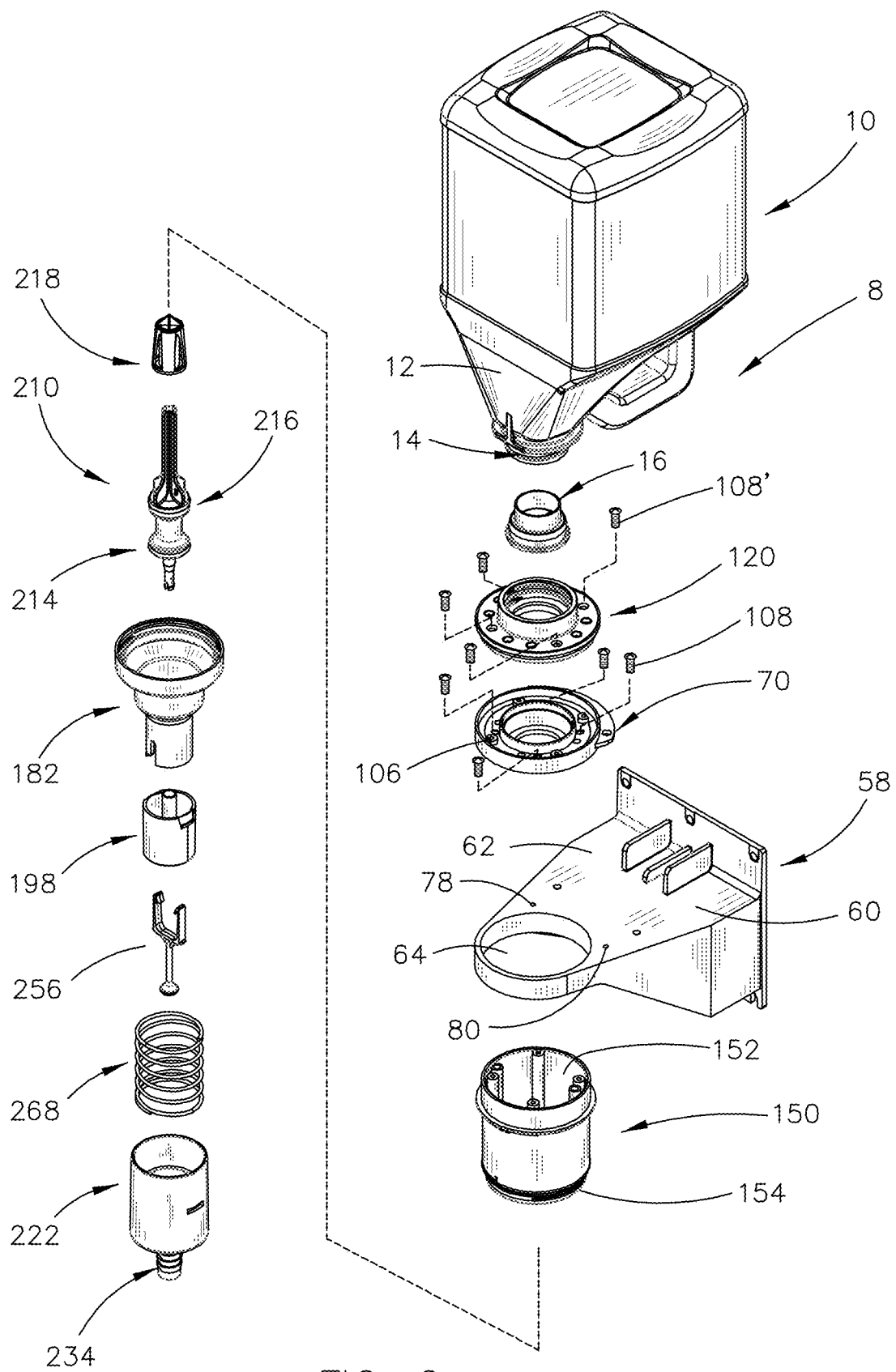
FIG. 2 is an exploded perspective view of the dispensing and/or dosing system of this invention.
Figure 3:
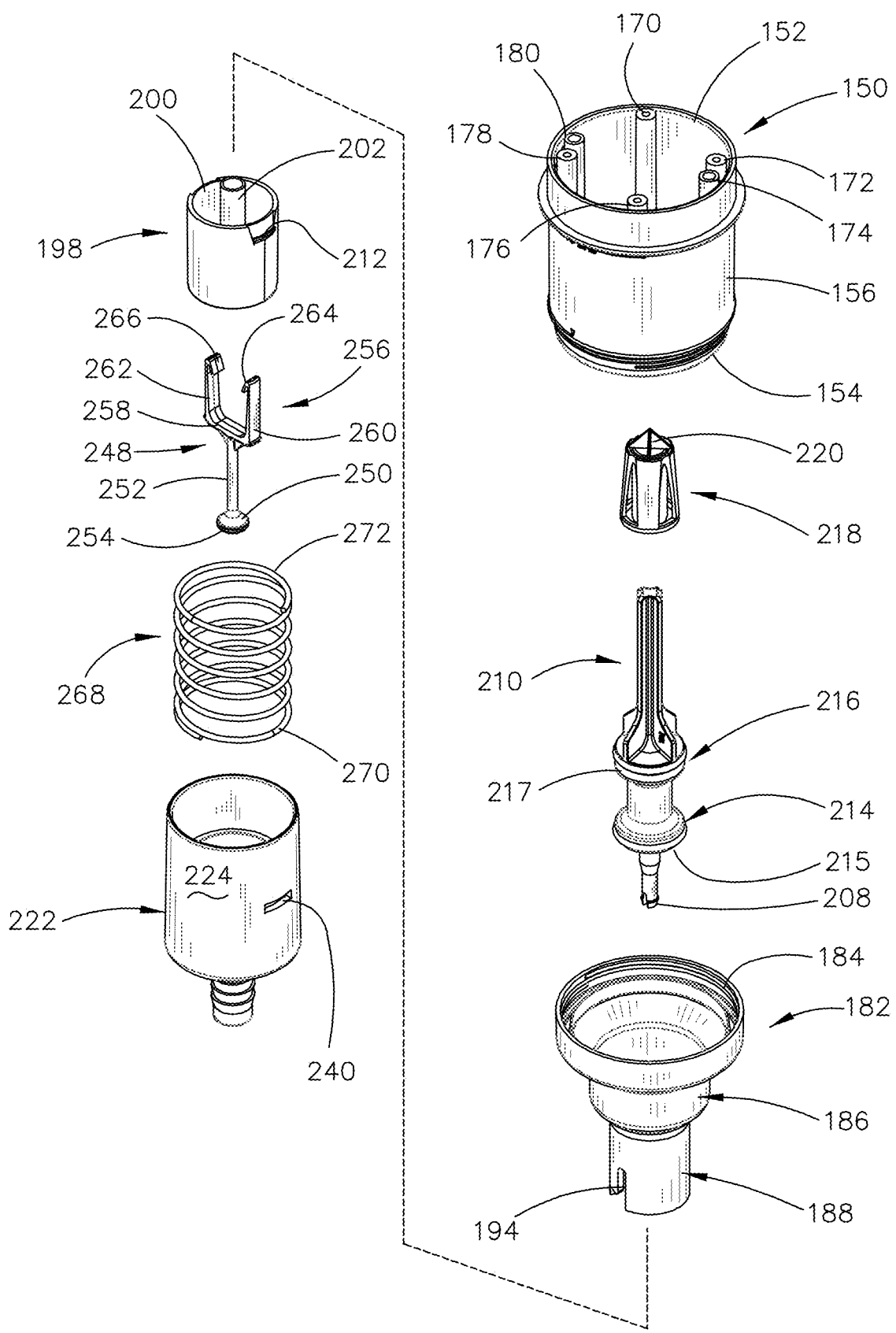
FIG. 3 is an exploded perspective view of a portion of the dispensing and/or dosing system of this invention.
Figure 4:
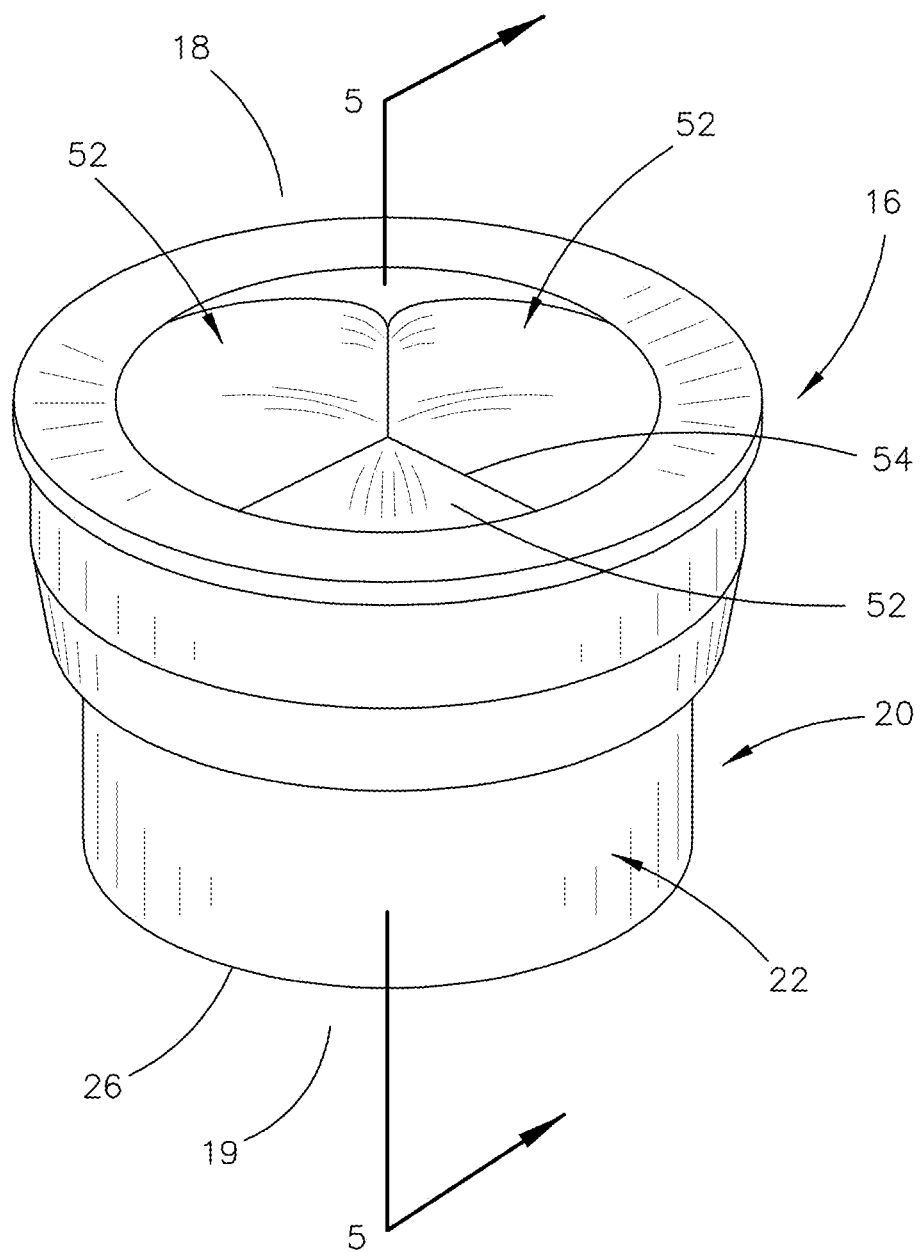
FIG. 4 is a perspective view of the tricuspid valve of this invention.
Figure 5:
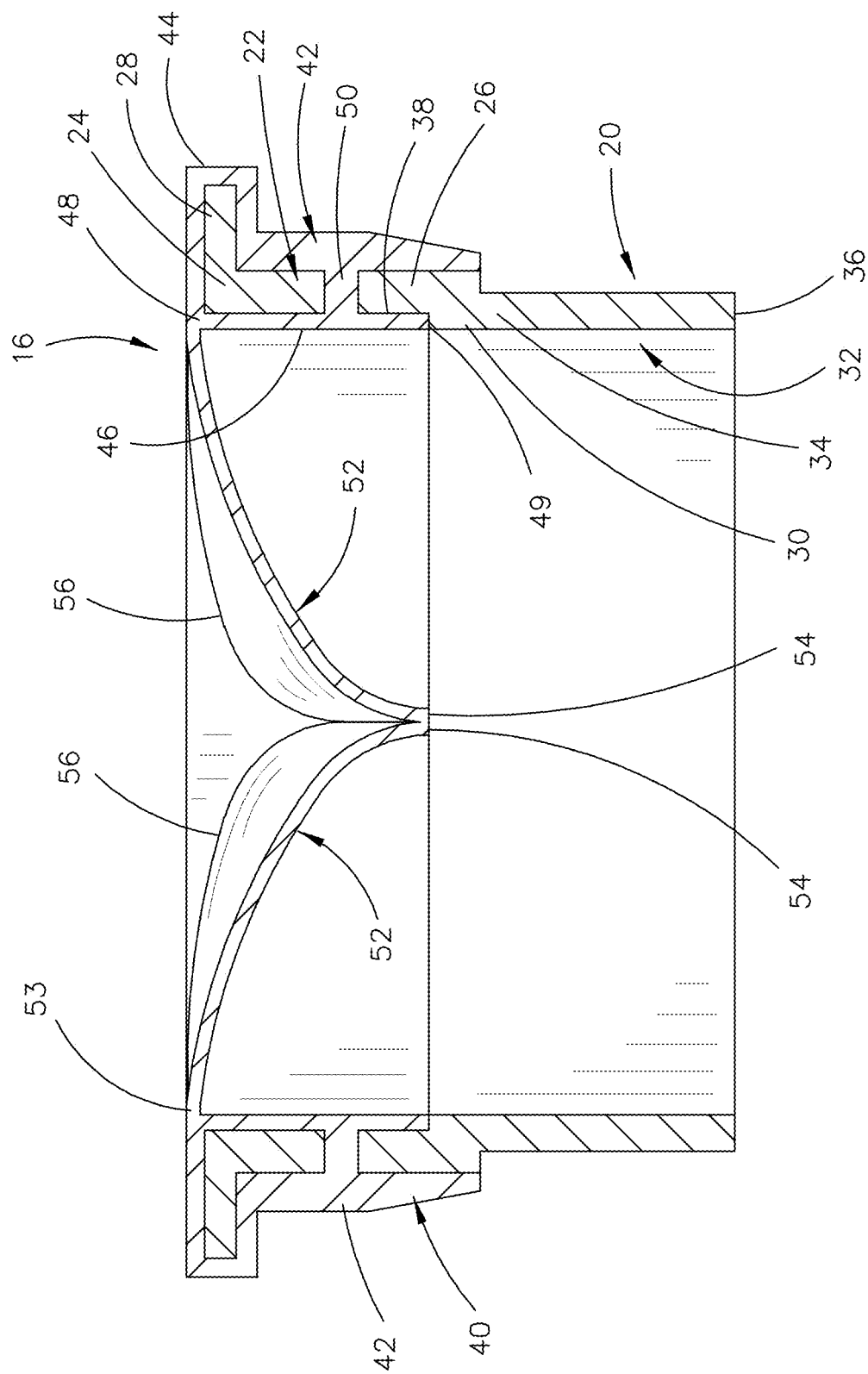
FIG. 5 is a sectional view of the tricuspid valve of FIG. 4 as seen on lines 5-5 of FIG. 4.
Figure 6:
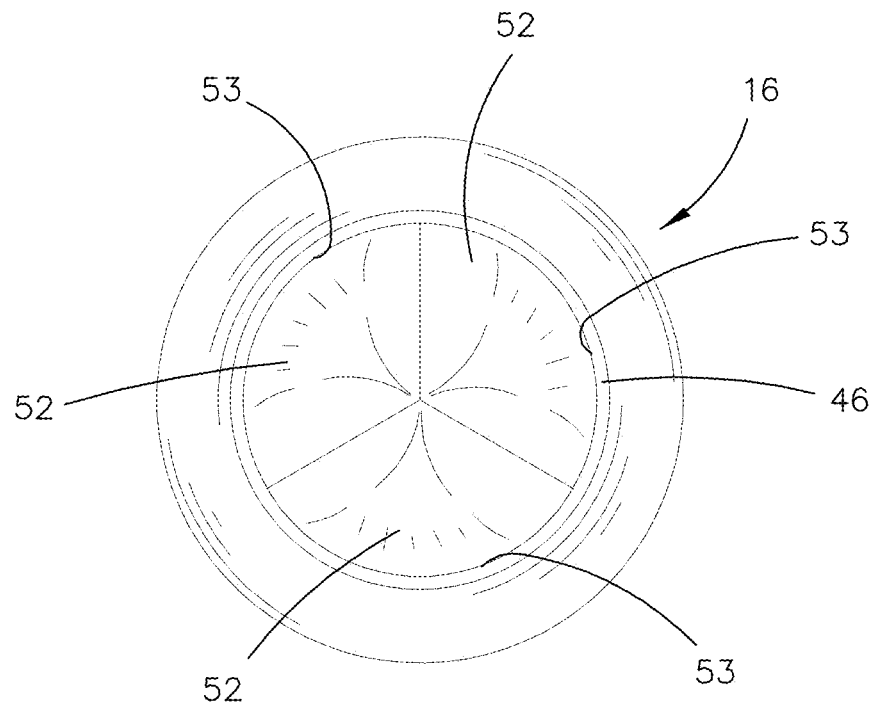
FIG. 6 is a top view of the tricuspid valve of FIG. 4.
Figure 7:
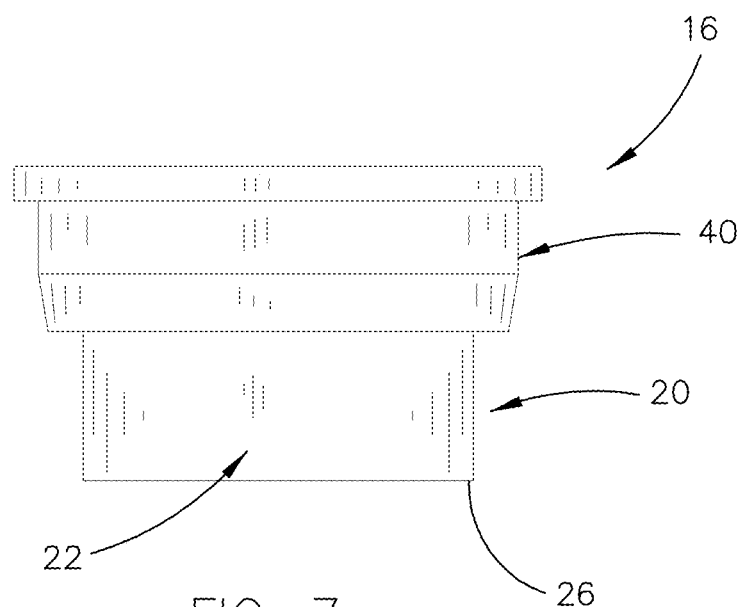
FIG. 7 is a side view of the tricuspid valve of FIG. 4.
Figure 8:
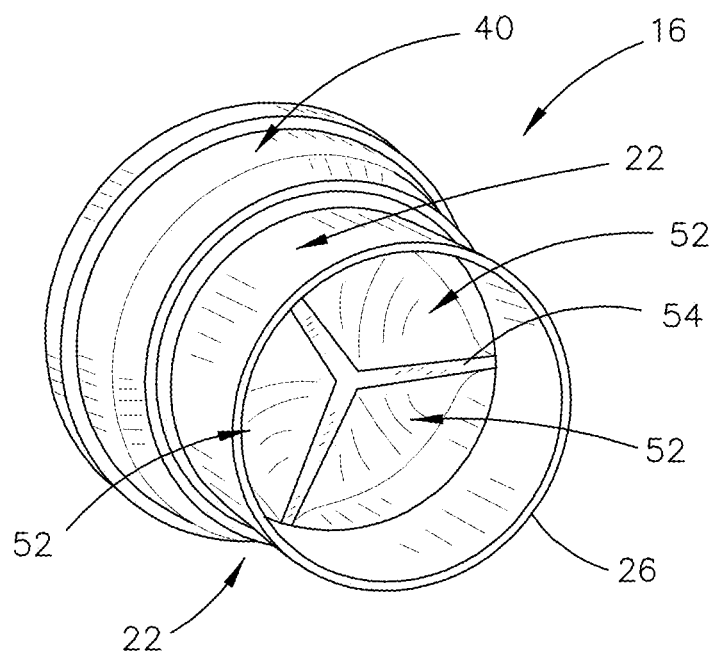
FIG. 8 is a lower perspective view of the tricuspid valve of FIG. 4.
Figure 9:
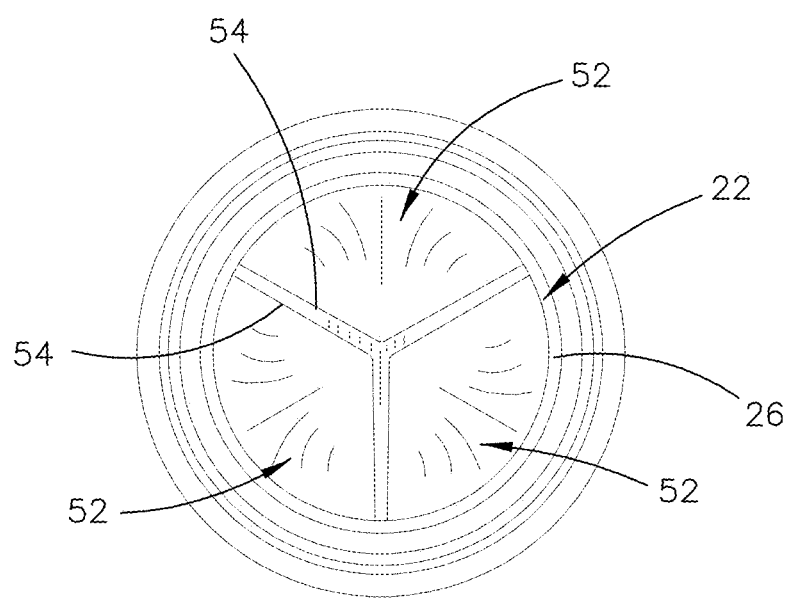
FIG. 9 is a bottom view of the tricuspid valve of FIG. 4.

The system 8 may be mounted in different ways. The preferred method of mounting and supporting the system 8 is shown in the drawings. As numeral 58 refers to a vertically disposed mounting plate 58 which is secured to a wall, cabinet, etc., a shelf 60 extends outwardly from mounting plate 58 and has a horizontally disposed upper end 62. A large opening 64 is formed in the outer end of shelf 60 as seen in FIG. 2. Openings 66 and 68 are formed in the upper end 62 of shelf 60.

The numeral 70 refers to a mounting ring having an upper side 72 and a lower side 74. Flange 76 extends rearwardly from ring 70. Screws are extended downwardly through openings 78 and 80 in shelf 62 with the screws being positioned at the ends of flange 76 to prevent ring 70 from rotating. The upper side 72 of ring 70 has a pair of upstanding, spaced-apart ring-shaped walls 82 and 84 which have a bottom wall 86 extending therebetween to define a generally U-shaped channel 88. Bottom wall 88 preferably has 4 larger openings 90, 92, 94 and 96 which extend therethrough. Wall 88 preferably has 4 smaller openings 98, 100, 102 and 104 formed therein which extend therethrough. Bottom 88 also has four hollow screw posts 106 extending upwardly therefrom adapted to receive screws 108 therein as will be described thereinafter.

Figure 11:
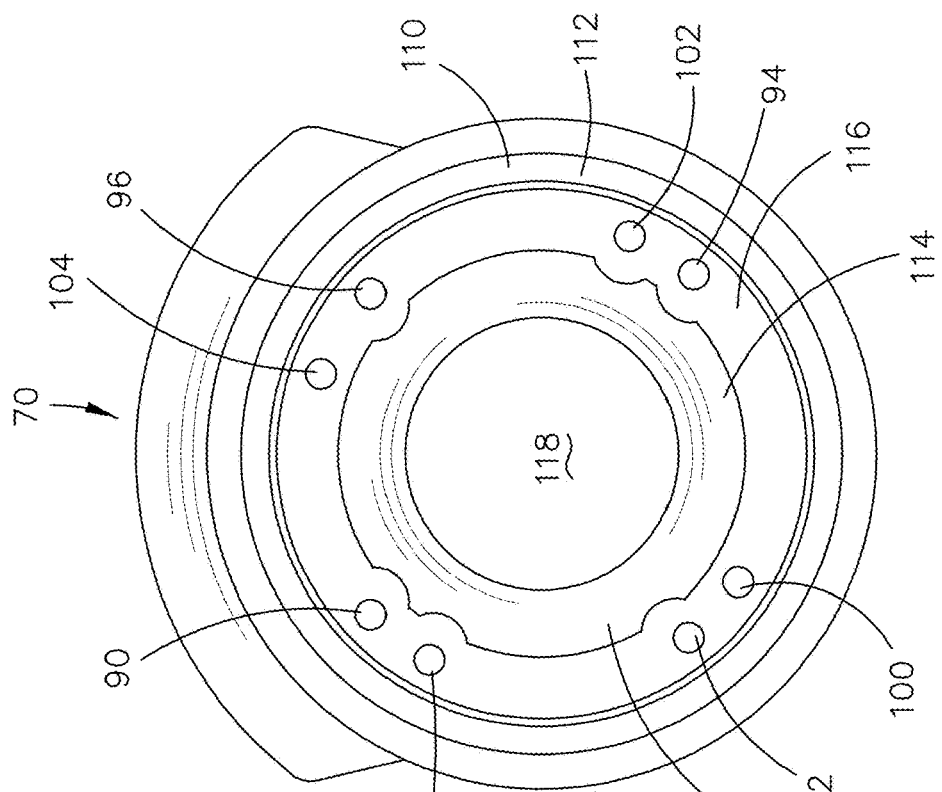
FIG. 11 is a bottom view of the mounting ring of this invention.
Figure 10:
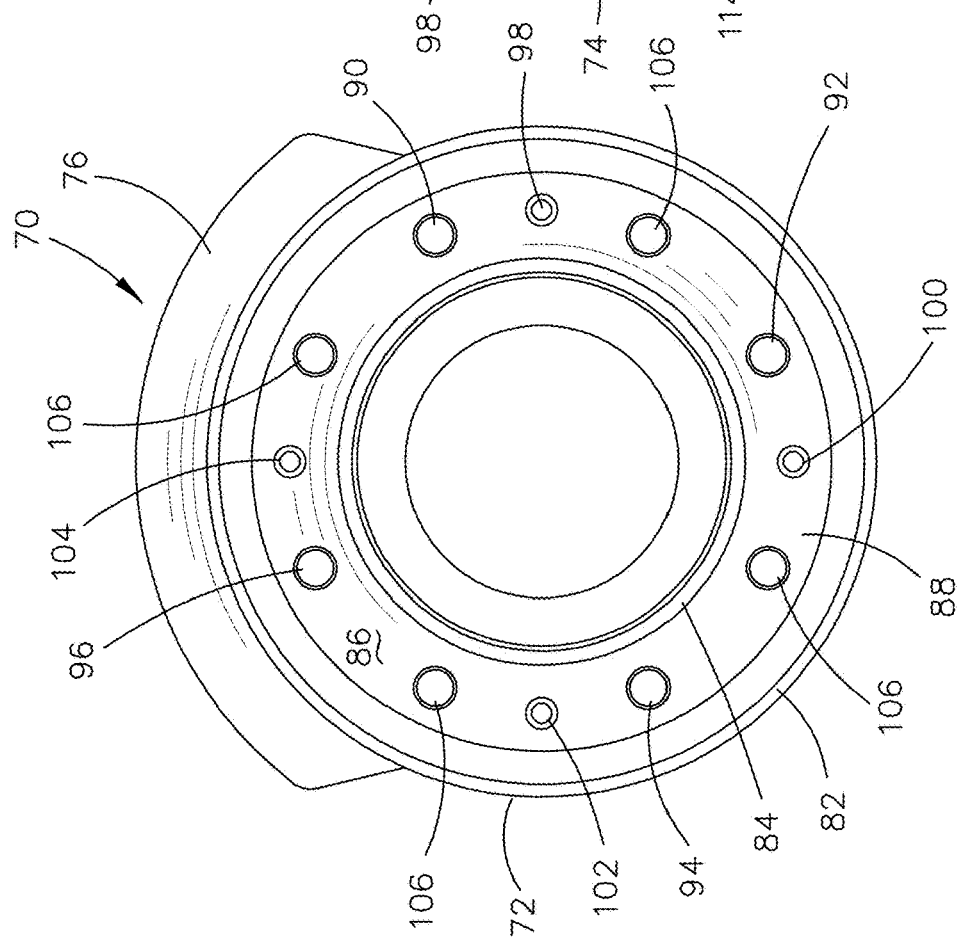
FIG. 10 is a top view of the mounting ring of this invention.
Figure 12:
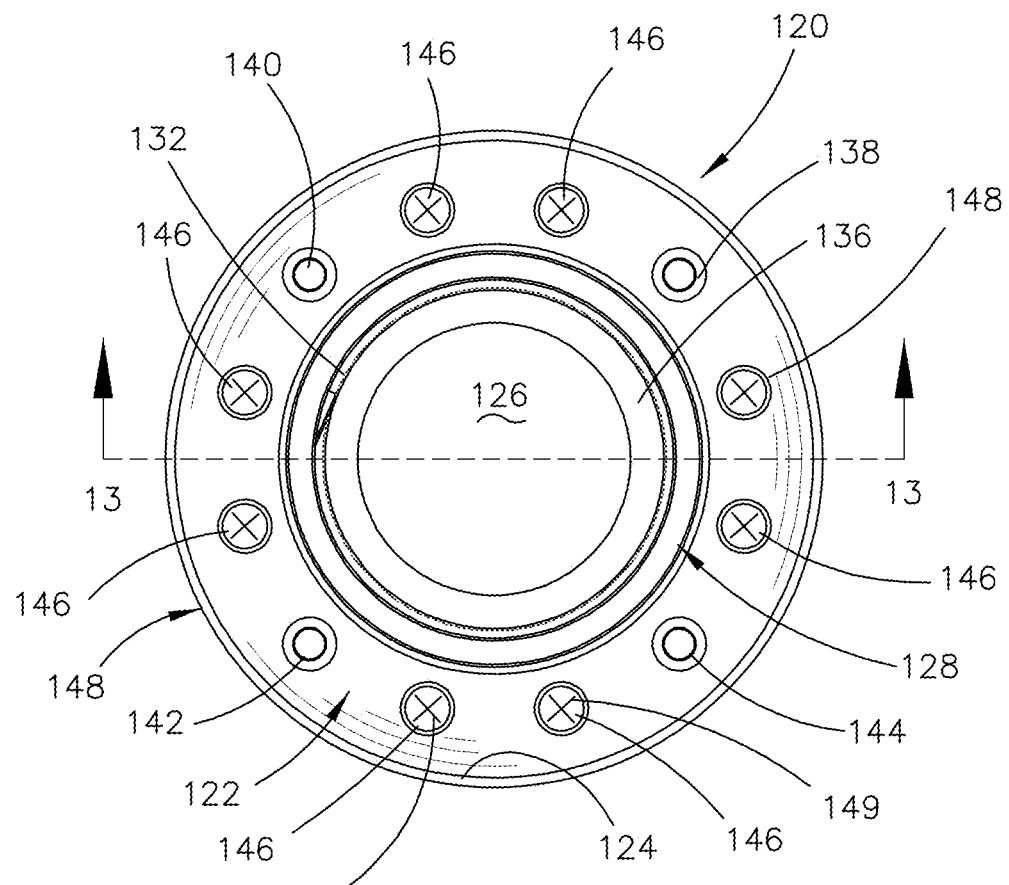
FIG. 12 is a top view of the vent ring of this invention.

The underside of ring 70 (FIG. 11) is provided with an annular recess 110 which extends upwardly thereinto. The underside of ring 70 is also provided with an annular wall 112 which extends downwardly therefrom inwardly of recess 110. The underside of ring 70 further has a cylindrical body portion 114 extending downwardly therefrom to define an inverted, generally U-shaped channel 116 which communicates with the lower ends of openings 90, 92, 94, 96, 98, 100, 102 and 104. Body portion 114 has a central opening 118.

Figure 13:
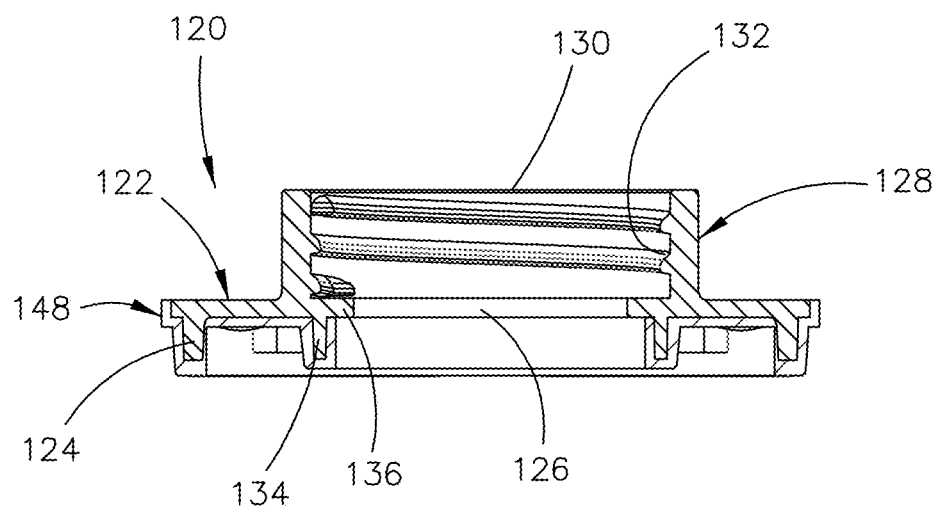
FIG. 13 is a sectional view of the vent ring of this invention as seen on lines 13-13 of FIG. 12.
Figure 14:
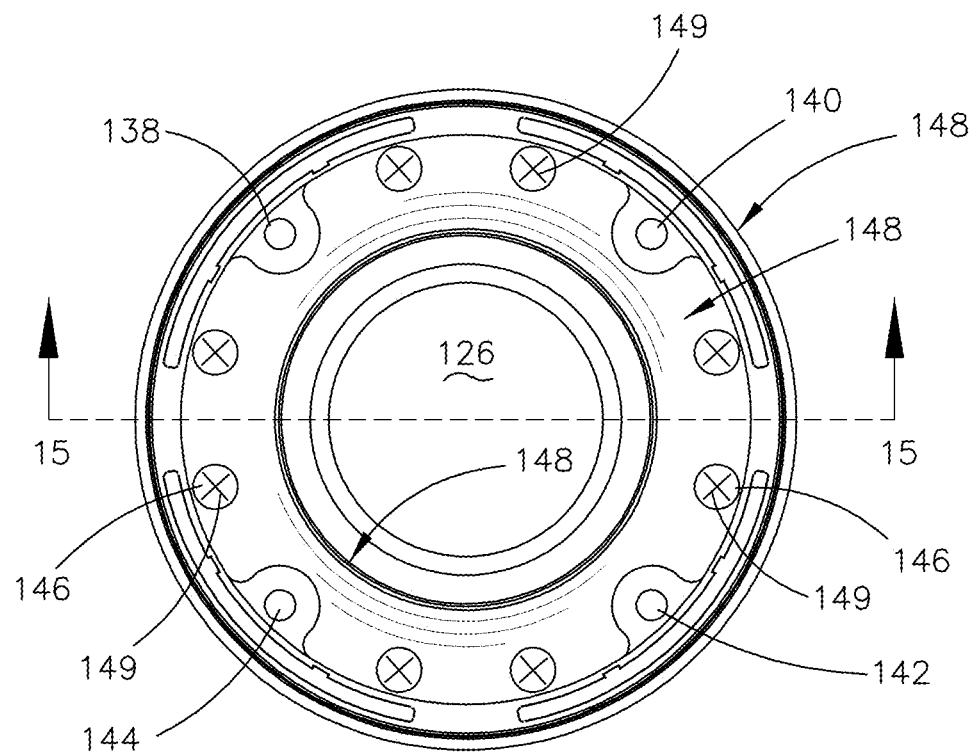
FIG. 14 is a bottom view of the vent ring of this invention.
Figure 15:
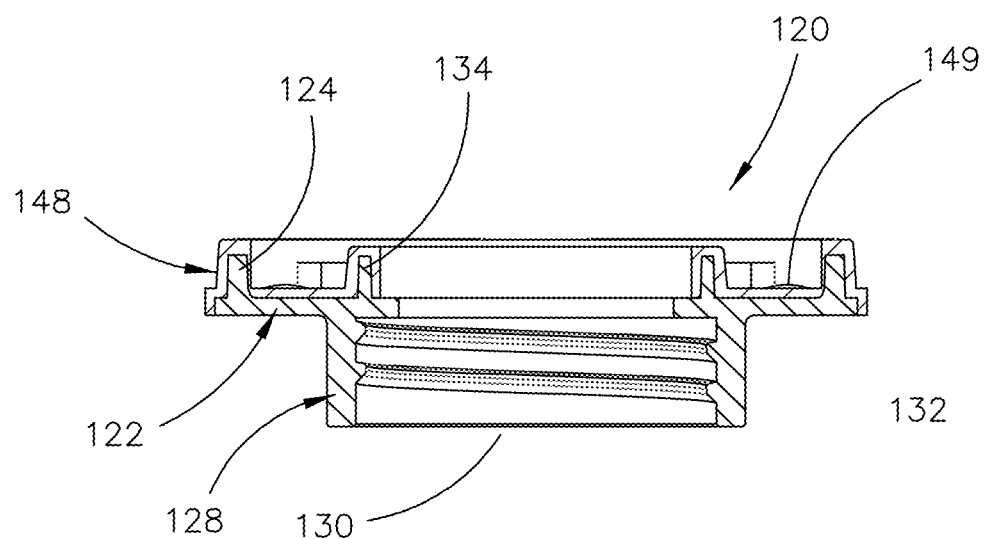
FIG. 15 is a sectional view of the vent ring of this invention as seen on lines 15-15 of FIG. 14.
Figure 16:
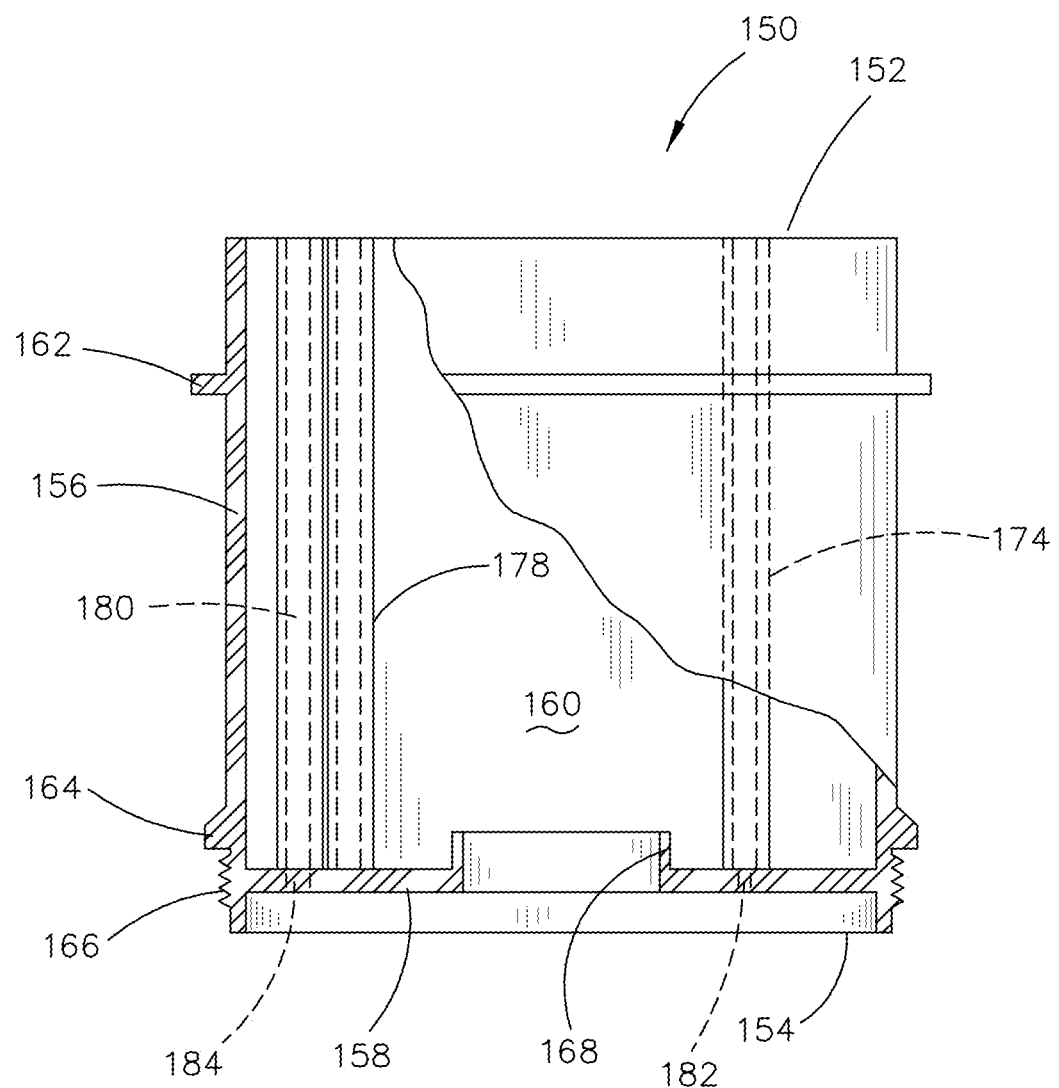
FIG. 16 is a side view of the accumulator of this invention with a portion thereof cut-away to more fully illustrate the accumulator.
Figure 17:
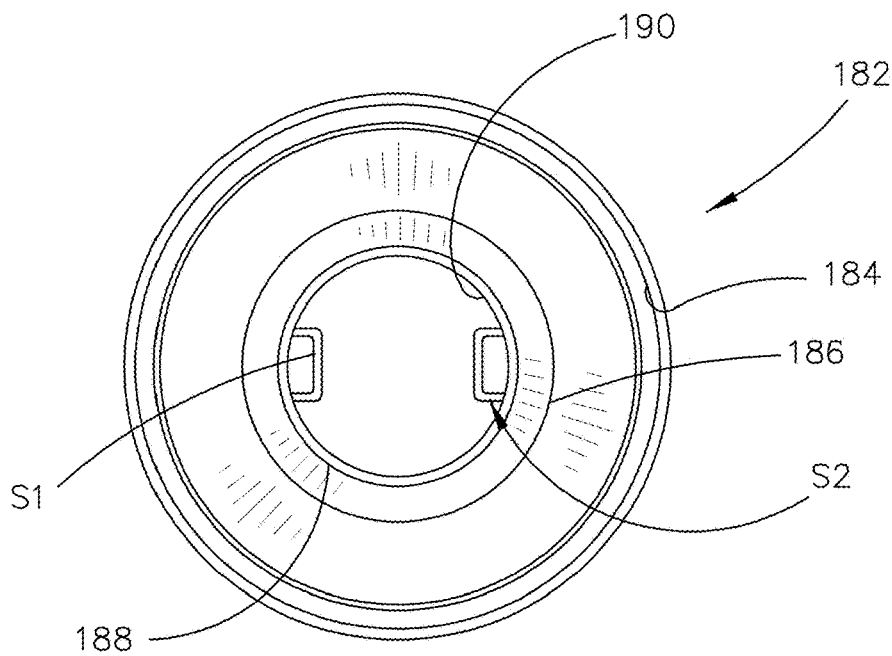
FIG. 17 is a top view of the dosing bowl of this invention.
Figure 18:
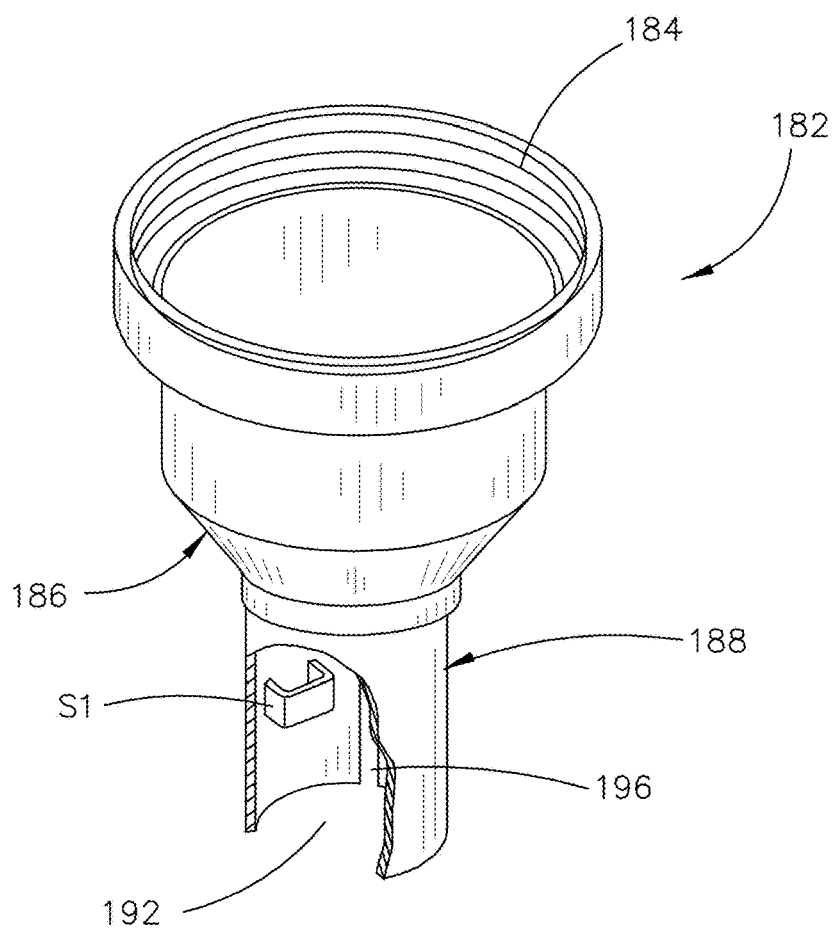
FIG. 18 is a perspective view of the dosing bowl of this invention with a portion thereof cut-away to more fully illustrate the dosing bowl.
Figure 19:
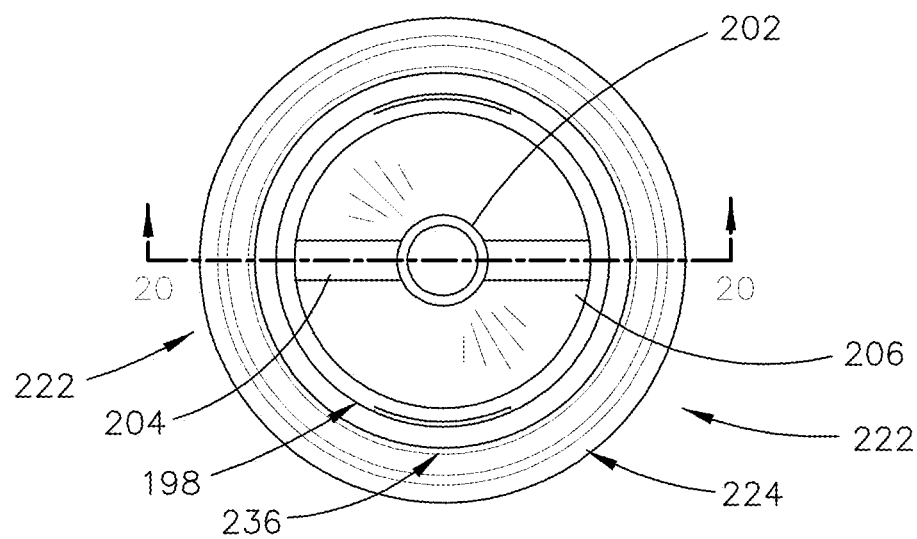
FIG. 19 is a top view of the actuator of this invention having the actuator sleeve of this invention positioned therein.
Figure 20:
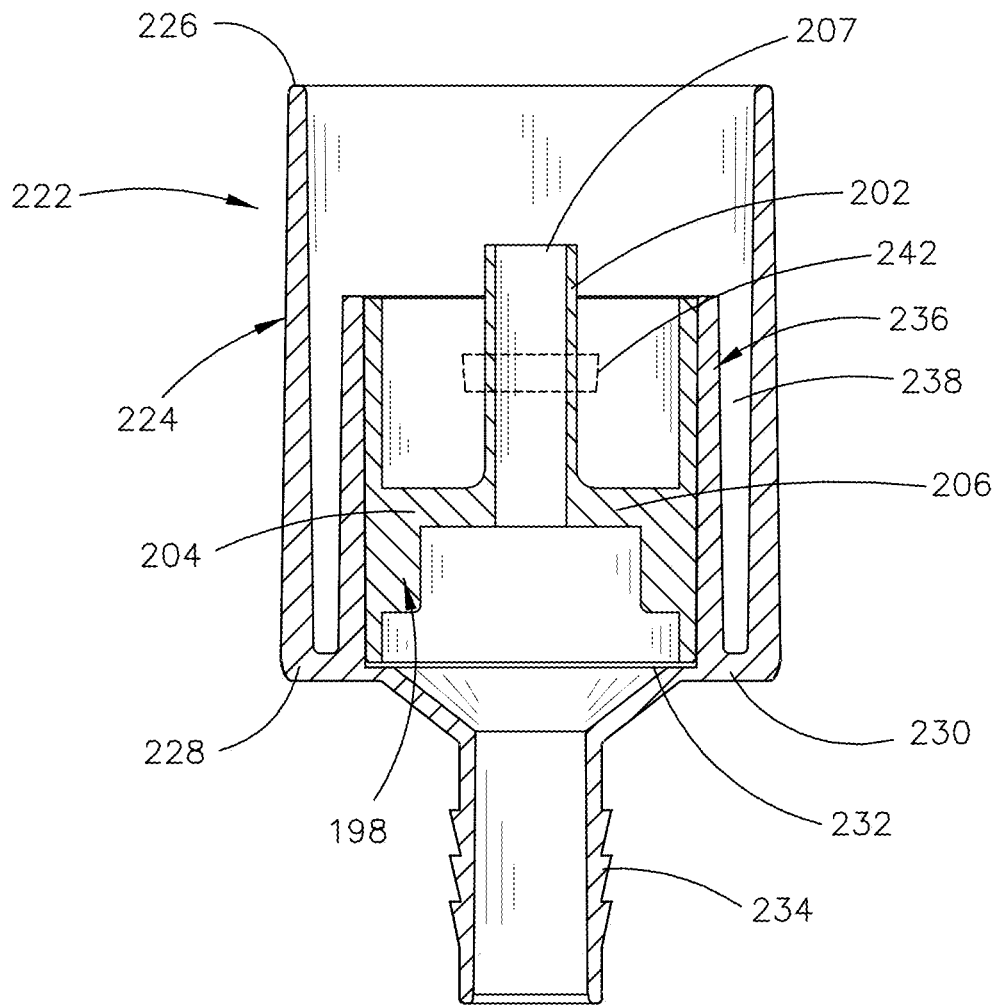
FIG. 20 is a sectional view as seen on lines 20-21 of FIG. 19.
Figure 21:
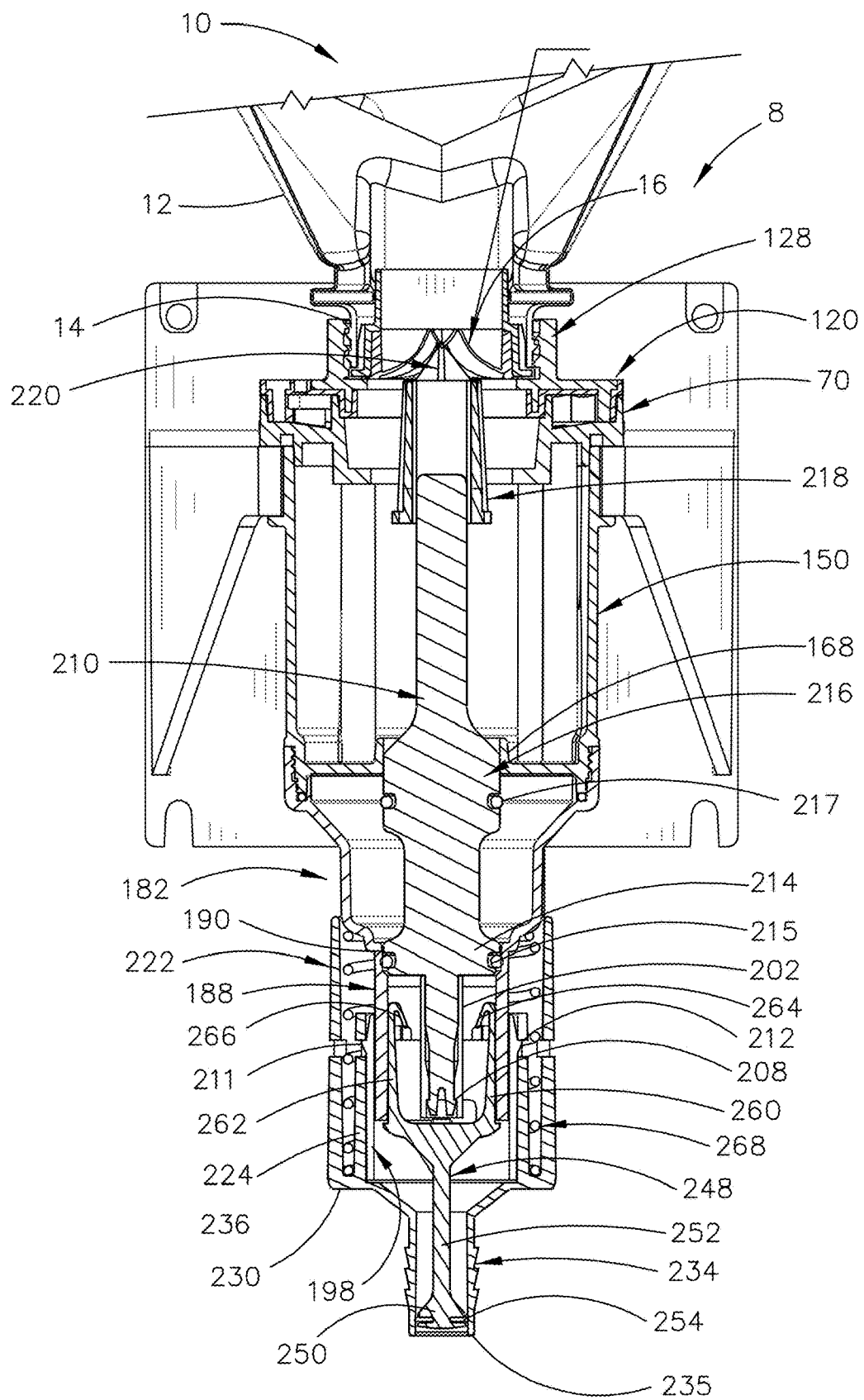
FIG. 21 is a partial vertical sectional view of the dispensing and/or dosing system of this invention with the actuator and the actuator rod of this invention being in the lower position.
Figure 22:
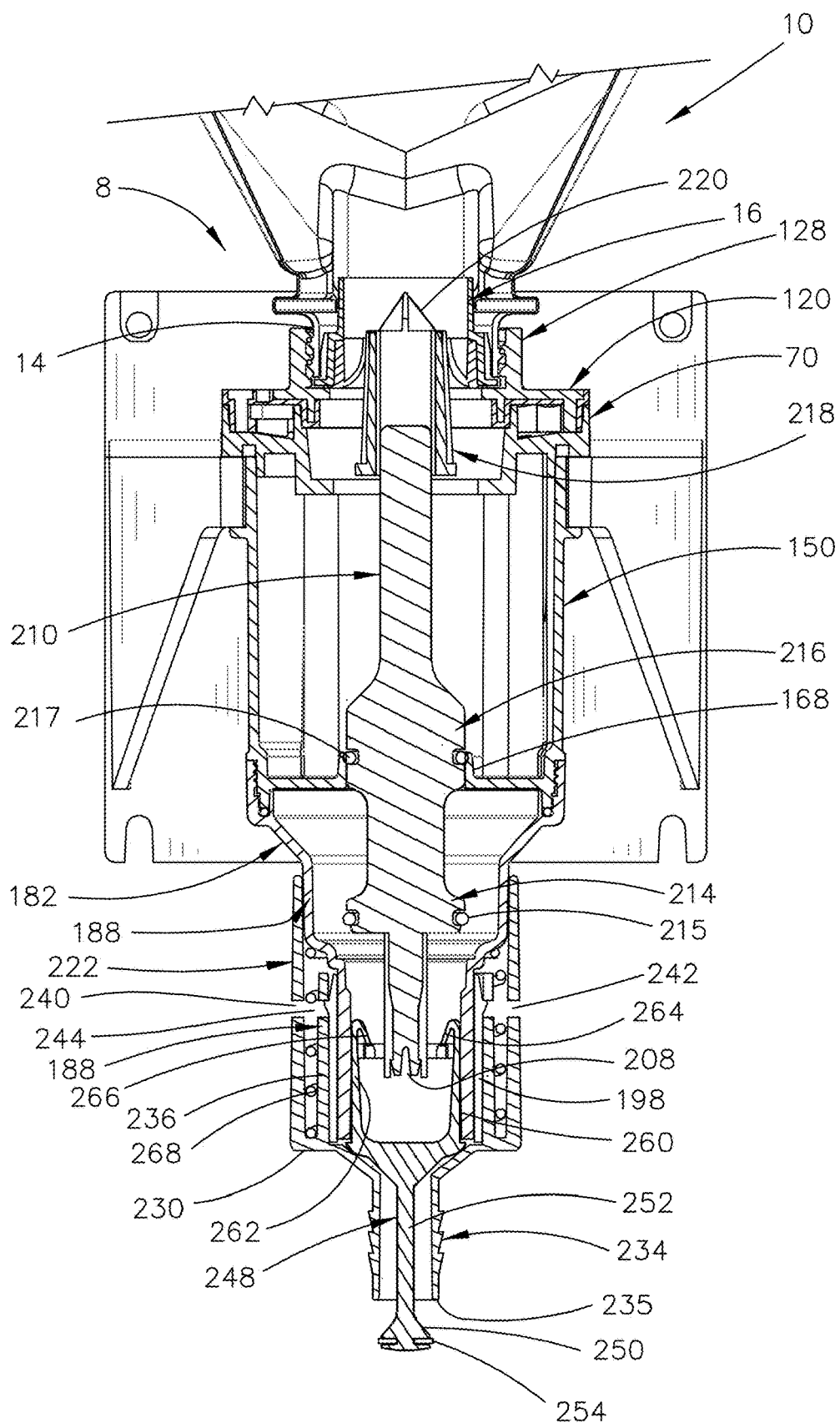
FIG. 22 is a partial sectional view of the dispensing and/or dosing system of this invention with the actuator and actuator rod of the invention being in the upper position.

The upper end of mounting ring 70 has an overmolded and ring-shaped vent ring 120 mounted thereon. Vent ring 120 includes a ring-shaped and horizontally disposed wall portion 122 having a ring-shaped lip 124 extending downwardly from the outer end of wall portion 122 and inwardly thereof. Wall portion 122 includes a central opening 126 formed therein. Vent ring 120 also includes an upstanding and circular wall portion 128 which extends upwardly from wall portion 122 as seen in FIG. 13. Wall portion 128 has an opening 130 formed therein which communicates with opening 126. As seen, wall portion 128 has internal threads 132 formed therein. As seen, a circular or ring-shaped wall 134 extends downwardly from the underside of wall portion 122 outwardly of opening 126. As also seen in FIG. 13, opening 126 has a diameter which is less than the diameter of opening 132 thereby creating a horizontally extending shoulder 136.

Wall portion 122 has four radially spaced-apart screw openings 138, 140, 142 and 144 formed therein. Wall portion 122 also has eight vent openings 146 formed therein which extend therethrough. Overmolding 148 is applied to a portion of vent ring 120 as best seen in FIG. 13. The plastic overmolding is comprised of metallocene, TPV, TPU or TPE and embraces the outer end of wall portion 122, the outer, lower and inner sides of lip 124, the underside of wall portion 122, the outer side of wall 134, the lower end of wall 134 and the inner side of wall 134. Thus, the overmolding plastic closes the lower ends of the eight vent openings 146. A cross-slit valve 149 is formed in the overmolding material at the lower ends of the vent openings 146 which permit venting air to pass therethrough while preventing liquid from passing therethrough.

Vent ring 120 is positioned on the upper side of mounting ring 70 so that the screw openings 138, 140, 142 and 144 register with the screw posts 106 of mounting ring 70. Screws 108' are extended downwardly through the screw openings 138, 140, 142 and 144 into the screw posts 106 to secure vent ring 120 to mounting ring 70.

The numeral 150 refers to a cup-shaped or cylindrical-shaped accumulator having a open upper end 152 and a lower end 154. Accumulator 150 includes an outer wall 156 having a bottom wall 158 extending therebetween to define an interior compartment 160. The exterior surface of outer wall 156 has an annular shoulder or ring 162 extending outwardly therefrom below the upper end thereof. The exterior surface of outer wall 156 also has an annular shoulder or ring 164 extending outwardly therefrom above the lower end thereof. The exterior surface of outer wall 156 has external threads 166 formed therein below ring 164. The bottom wall 158 has a central valve seat 168 formed therein.

The accumulator 150 has six elongated and vertically disposed hollow tubes 170, 172, 174, 176, 178 and 180 positioned in the interior compartment 160 thereof. The lower ends of the tubes 170, 172, 174, 176, 178 and 180 are fixed to bottom wall 158 at the inner side of outer wall 158. The upper ends of tubes 170, 172, 176 and 178 are configured to receive a screw therein as will be described hereinafter. The lower ends of tubes 170, 172, 176 and 178 are closed. The upper ends of tubes 174 and 180 are open and the lower open ends of tubes 174 and 180 communicate with openings 182 and 184 respectively which are formed in bottom wall 158. Tubes 170, 172, 176 and 178 do not serve as vent tubes but are merely mounting tubes for screws. The vent tubes 174 and 180 serve as vent tubes as will be described hereinafter.

The upper end 152 of accumulator 150 is inserted upwardly into opening 64 of shelf 60 until shoulder 162 engages the underside of shelf 60. Screws 108 are then extended downwardly through screw openings 90, 92, 94 and 96 in mounting ring 70 and into the upper ends of tubes 170, 172, 176 and 178 to not only secure accumulator 150 to shelf 60 but to also secure mounting ring 70 to shelf 60. Such attachment will be accomplished prior to vent ring 120 being secured to the mounting ring 70.

Assembly 8 also includes a dosing or dispensing cup or bowl 182 having an internally threaded upper end portion 184 which is threadably secured to the threaded portion 166 of accumulator 150. Bowl 182 includes a conical-shaped portion 186 which extends downwardly and inwardly from upper end portion 184 to a tubular portion 188, the upper interior end of which defines a valve seat 190. The lower end of tubular portion 188 is open to form a discharge opening 192.

The lower end of tubular portion 188 has a pair of slots 194 and 196 formed therein which extend upwardly into tubular portion 188 from the lower end of tubular portion 188. The interior of tubular portion 188 has a pair of drip tube supports S1 and S2 which extend inwardly into the interior of tubular portion 188.

An actuator sleeve 198 is vertically movably mounted on the tubular portion 188 and has a central opening 200 which slidably receives tubular portion 188. A vertically disposed and hollow actuator rod support 202 is positioned in opening 200 and is supported by a pair of horizontally extending spokes 204 and 206 which are molded to sleeve 198. Support 202 has an open upper end 207 which receives the lower end 208 of an actuator rod 210. Then lower end 208 of actuator rod 210 includes a split head portion which is frictionally secured to the support 202 whereby vertical movement of actuator sleeve 198 will cause vertical movement of actuator rod 210. Actuator sleeve 198 has a pair of flexible locking tabs 211 and 212 extending outwardly from the exterior of sleeve 198 at the upper end thereof.

Actuator rod 210 has a lower disc-shaped valve 214 extending outwardly therefrom below the lower end 208 of rod 210. Valve 214 includes a flexible O-ring 215. Actuator rod 210 has an upper disc-shaped valve 216 extending outwardly therefrom above valve 212. Valve 216 includes an O-ring 217. The upper end of actuator rod 210 has a lance member 218 press-fitted thereon. Lance member 218 has a sharp point or lance 220 extending upwardly therefrom.

The numeral 222 refers to an actuator collar having an outer cylindrical wall 224 having an upper end 226 and a lower end 228. A bottom wall 230 extends across the lower end of wall 224 and has an opening 232 formed therein. A discharge tube 234 extends downwardly from opening 232. Actuator collar 222 also includes an inner cylindrical wall 236 which extends upwardly from bottom wall 230 inwardly of outer cylindrical wall 224 to create an annular space 238 therebetween. Outer cylindrical wall 224 has a pair of openings or slots 240 and 242 formed therein. Inner cylindrical wall 236 has a pair of openings or slots 244 and 246 formed therein which register with slots 240 and 242 in outer cylindrical wall 224 respectively.

Actuator sleeve 198 is press-fitted into the interior of inner cylindrical wall 236 with the locking tabs 211 and 212 being received in the slots 244 and 246 of inner cylindrical wall 236. The numeral 248 refers to the anti-drip valve means of this invention. Valve means 248 includes a valve member 250 having a stem 252 extending upwardly therefrom. An O-ring 254 is provided on valve member 250. The upper end of stem 252 has a connection means 256 secured to the upper end thereof.

Connection means 256 includes a base member 258 having legs 260 and 262 extending upwardly therefrom. The upper ends of legs 260 and 262 have downwardly extending flexible locking portions 264 and 266 provided therein.

During the assembly process, the anti-drip valve means 248 is inserted into the system by extending the valve stem 252 and valve member 250 downwardly into the interior of collar 222 until the valve member 250 is positioned below the lower end of nozzle 234. The actuator sleeve 198 is then inserted downwardly into the interior of actuator 222. This assembly is then slipped upwardly onto the tubular portion 188 with legs 260 and 262 extending upwardly through the interior of sleeve 198. The upper ends of legs 260 and 262 are received by the channels 211 and 212 respectively with the locking portions 264 and 266 extending over the upper ends of the channels 211 and 212 to lock the anti-drip valve means 248 to the bowl 182.

The numeral 268 refers to a vertically disposed coil spring having a lower end 270 and an upper end 272. The lower portion of spring 268 is positioned in the annular space 238 between the inside surface of outer cylindrical wall 224 of actuator collar 222 and the outer surface of inner cylindrical wall 236. The lower end 270 of spring 268 engages the bottom wall 230 of actuator collar 222. The upper end 272 of spring 268 engages the lower end of the conical-shaped portion 186 of bowl 182. Spring 268 yieldably resists the upward movement of actuator collar 222 with respect to the tubular portion 188 of bowl 182.

When it is desired to dose or dispense liquids, the bottle 10 is inverted and threadably secured to the internal threads 132 of vent ring 120. At this time, the actuator collar 222 and the actuator rod 210 secured thereto will be in the lowermost position so that the lance 220 on the upper end of actuator rod 210 will not cause valve 16 to open at this time. At this time, valve 210 will be open and valve 214 will be closed. At this time, there will be air in the accumulator 150 and the dispensing bowl 182. There will also be some air in the channel 88 at the underside of the mounting ring 70.

To begin the dispensing operation, the actuator collar 222 is moved from its lower position to its upper position which causes the lance 220 at the upper end of the actuator rod 210 to pierce or tear the valve 16 to open the same. At this time, valve 216 will be closed and valve 214 will be open. As liquid drains into the accumulator 150, the air in the accumulator 150 will go through the liquid flowing from the container 10 into the container 10 to replace the liquid draining therefrom to prevent an airlock. The air in the accumulator 150 will also flow upwardly into the channel 88 of mounting ring 70 through the vent openings 100 and 104. Excess air in the channel 88 will also pass upwardly through the cross-slit valves 149 in the vent openings 146 in vent ring 120. Some air may also pass downwardly through the two vent tubes 178 and 180 into the open bowl 182.

When the accumulator 150 has been filled with liquid and it is desired to fill the bowl 182, the actuator collar 222 is moved to its lower position which causes valve 16 to automatically close, the valve 216 to open and the valve 214 to close. As the liquid flows from the accumulator 150 into the bowl 182, the air in bowl 182 passes upwardly through the two vent tubes 174 and 180. The air in channel 88 flows through the two vent holes 102 and 104 into the interior of the accumulator to replace the liquid draining from the accumulator 150 into the bowl 182.

When it is desired to dispense or dose the liquid from the bowl 182, the actuator collar 222 is moved upwardly which causes valve 214 to open and valve 216 to close. As liquid drains from the bowl 182 and discharge nozzle 192, the liquid volume therein is replaced with air from the bottom of the two vent tubes 174 and 178 with air from channel 88 flowing downwardly through the vent tubes. The air from the accumulator interior compartment 160 flows into the container 10 through valve 16 and also into the channel 88. As this happens, liquid flows from the container 10 by way of valve 16 downwardly into the accumulator 150 so that the cycle may begin again.

Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A dispensing and/or dosing system, comprising:
an inverted liquid container having upper and lower ends;
said lower end of said container having a hollow throat extending downwardly therefrom which has interior and exterior surfaces;
said exterior surface of said throat being threaded;
a tricuspid valve, having upper and lower ends, positioned in said throat of said container;
said tricuspid valve being normally closed;
a horizontally disposed support shelf having a circular opening formed therein;
a mounting ring positioned on said shelf and having a central opening formed therein which registers with said circular opening of said support shelf;
said mounting ring having a plurality of radially spaced-apart vent openings formed thereto;
a vent ring positioned on said mounting ring and being secured thereto;
said vent ring having a central opening formed therein which registers with said central opening in said mounting ring;
said central opening of said vent ring being internally threaded;
said vent ring having a plurality of radially spaced-apart vent openings formed therein;
each of said vent openings of said vent ring having a normally closed slit valve associated therewith which permits air to pair therethrough but preventing liquid from passing therethrough;
said vent openings in said vent ring being in communication with said vent openings in said mounting ring;
said threaded exterior surface of said throat of said container being threadably secured to said internal threads of said central opening of said vent ring whereby said lower end of said tricuspid valve is in communication with said central opening of said vent ring;
a cylindrical and hollow accumulator having an open upper end and a bottom wall;
said bottom wall of said accumulator having a circular first valve seat formed therein;
said upper end of said accumulator being received in said circular opening of said support shelf and being secured therein by said mounting ring;
a hollow dosing cup comprising:
(a) a hollow ring-shaped and horizontally disposed upper wall portion having an upper end, a lower end, an outer surface and an inside surface which is threaded;
(b) a hollow and generally shaped conical-shaped wall portion having an open upper end, an open lower end, an outer surface and an inner surface;
(c) said hollow and said generally shaped conical-shaped wall portion extending downwardly and inwardly from said lower end of said upper wall portion;
(d) a hollow and cylindrical lower wall portion having an open upper end and an open lower end;
(e) said hollow and cylindrical lower wall portion extending downwardly from said lower end of said hollow and said generally shaped conical-shaped wall portion;
(f) said upper end of said upper wall portion being threadably secured to said lower end of said accumulator;
(g) said dosing cup having a circular second valve seat positioned between said lower end of said generally conical-shaped wall portion and said upper end of said lower wall portion of said dosing cup;
a vertically disposed and cylindrical actuator having an open upper end, an open lower end, an outer side and an inner side;
said actuator slidably embracing said hollow and cylindrical lower wall portion of said dosing cup;
said actuator being selectively movable between upper and lower positions with respect to said lower wall portion of said dosing cup;
an elongated actuator rod, having an upper end and a lower end, which includes:
(a) a disc-shaped upper valve secured to said actuator rod below said upper end thereof; and
(b) a disc-shaped lower valve secured to said actuator rod above said lower end thereof;
said lower end of said actuator rod being operatively secured to said actuator for vertical movement with said actuator between upper and lower positions;
a pointed lance member at said upper end of said actuator rod;
said pointed lance member creating a liquid discharge opening in said tricuspid valve when said actuator rod and said actuator are in said upper positions;
said disc-shaped upper valve of said actuator rod being in engagement with said first valve seat to close said first valve seat when said actuator and said actuator rod are in said upper positions;
said disc-shaped lower valve of said actuator rod being spaced above said second valve seat when said actuator and said actuator rod are in said upper positions;

said disc-shaped upper valve of said actuator rod being spaced below said first valve seat when said actuator and said actuator rod are in said lower positions; and said disc-shaped lower valve of said actuator rod being in engagement with said second valve seat to close said second valve seat when said actuator and said actuator rod are in said lower positions.

2. The dispensing and/or dosing system of claim 1 wherein an anti-drip valve is secured to said lower wall portion of said dosing cup for closing said open lower end of said actuator when said actuator is in said lower position.

3. The dispensing and/or dosing system of claim 1 wherein said tricuspid valve is overmolded.

4. A dispensing and/or dosing system, comprising:
an inverted liquid container having an upper end and a lower end;
said lower end of said container having a hollow throat extending downwardly therefrom which has interior and exterior surfaces;
said exterior surface of said throat being threaded;
a normally closed tricuspid valve positioned in said throat;
said tricuspid valve having an upper end and a lower end;
said tricuspid valve being movable from its said normally closed position to an open position;
said tricuspid valve preventing liquid in said container from passing downwardly therethrough when in said closed position;
said tricuspid valve permitting liquid in said container to pass downwardly therethrough when in said open position;
said tricuspid valve including:
  (a) a plastic substrate portion including:
    (1) a hollow lower cylindrical wall having an upper end, a lower end, an inner side and an outer side;
    (2) a ring-shaped lip extending outwardly from said lower end of said lower cylindrical wall;
    (3) an annular shoulder extending inwardly from said upper end of said lower cylindrical wall which has an inner end and an outer end;
    (4) a hollow upper cylindrical wall, having an upper end and a lower end, which extends upwardly from said inner end of said shoulder;
  (b) a plastic overmolded portion including:
    (1) a first cylindrical wall embracing said outer side of said lower cylindrical wall of said substrate portion and which has an upper end and a lower end;
    (2) a lower end portion embracing said lip at said lower end of said lower cylindrical wall of said substrate portion;
    (3) a second cylindrical wall, having a lower end, an upper end, an inner side and an outer side, extending upwardly from said lower end portion and being positioned at said inner side of said lower cylindrical wall of said substrate portion;
said tricuspid valve including a molded portion extending across said second cylindrical wall;
said tricuspid valve permitting liquid to flow downwardly therethrough upon an upward force being applied thereto sufficient to create an opening therein;
said tricuspid valve returning to its said closed position upon the upward force being discontinued;
a horizontally disposed support shelf having a circular opening formed therein;

a mounting ring positioned on said shelf and having a central opening formed therein which registers with said circular opening of said support shelf;
said central opening of said mounting ring being internally threaded;
said threaded exterior surface of said throat being threadably secured to said internal threads of said central opening of said mounting ring whereby said lower end of said tricuspid valve is in fluid communication with said central opening of said mounting ring;
a cylindrical and hollow accumulator having an open upper end and a bottom wall;
said bottom wall of said accumulator having a circular first valve seat formed therein;
said upper end of said accumulator being received in said circular opening of said support shelf and being secured therein by said mounting ring;
a hollow dosing cup comprising:
  (a) a hollow ring-shaped and horizontally disposed upper wall portion having an upper end, a lower end, and an inside surface which is threaded;
  (b) a hollow and conical-shaped wall portion having an open upper end, an open lower end, an outer surface and an inner surface;
  (c) said hollow and conical-shaped wall portion extending downwardly and inwardly from said lower end of said upper wall portion;
  (d) a hollow and cylindrical lower wall portion having an open upper end and an open lower end;
  (e) said hollow and cylindrical lower wall portion extending downwardly from said lower end of said hollow and conical-shaped wall portion;
  (f) said upper end of said upper wall portion being threadably secured to said lower end of said accumulator;
  (g) said dosing cup having a circular second valve seat positioned between said lower end of said conical-shaped wall portion and said upper end of said lower wall portion of said dosing cup;
a vertically disposed and cylindrical actuator having an upper end, a lower end, an outer side, an inner side, an open upper end and an open lower end;
said actuator slidably embracing said hollow and cylindrical lower wall portion of said dosing cup;
said actuator being selectively movable between upper and lower positions with response to said lower wall portion of said dosing cup;
an elongated actuator rod, having an upper end and a lower end, which includes:
  (a) a disc-shaped upper valve secured to said actuator rod below said upper end thereof; and
  (b) a disc-shaped lower valve secured to said actuator rod above said lower end thereof;
said lower end of said actuator rod being secured to said actuator for vertical movement with said actuator between upper and lower positions;
a pointed lance member at said upper end of said actuator rod;
said pointed lance member creating a liquid discharge opening in said tricuspid valve when said actuator rod and said actuator are in said upper positions;
said upper disc-shaped valve of said actuator rod being in engagement with said first valve seat to close said first valve seat when said actuator and said actuator rod are in said upper positions;

said lower disc-shaped valve of said actuator rod being spaced above said second valve seat when said actuator and said actuator rod are in said upper positions;

said upper disc-shaped valve of said actuator rod being spaced below said first valve seat when said actuator and said actuator rod are in said lower positions; and said lower disc-shaped valve of said actuator rod being in engagement with said second valve seat to close said second valve seat when said actuator and said actuator rod are in said lower positions.

5. A dispensing and/or dosing system, comprising:

an inverted liquid container having upper and lower ends;

said lower end of said container having a hollow throat extending downwardly therefrom which has interior and exterior surfaces;

said exterior surface of said throat being threaded;

a tricuspid valve, having upper and lower ends, positioned in said throat of said container;

said tricuspid valve being normally closed;

a mounting ring member having upper and lower sides;

said mounting ring member having first and second upstanding ring-shaped walls, having inner and outer faces formed therein which have upper and lower ends and which have a bottom wall extending therebetween at the lower ends thereof to define a first channel;

said bottom wall of said mounting ring member having a plurality of radially spaced-apart vent openings formed therein;

said mounting ring member having a central opening formed therein inwardly of said inner face of said first wall thereof;

a vent ring having an upper side and a lower side;

said vent ring having an upstanding ring-shaped wall which extends upwardly therefrom;

said upstanding ring-shaped wall having interior and exterior sides;

said interior side of said upstanding ring-shaped wall being threaded;

said vent ring including a horizontally disposed and ring-shaped wall which extends around said upstanding ring-shaped wall thereof;

said upstanding ring-shaped wall of said vent ring having a central opening formed therein with an open upper end and an open lower end;

said upstanding ring-shaped wall of said vent ring being internally threaded;

said threaded exterior surface of said throat being threadably secured to the threaded interior side of said upstanding ring-shaped wall of said vent ring whereby said lower end of said tricuspid valve is in fluid communication with open upper end of said upstanding ring-shaped wall of said vent ring;

said horizontally disposed and ring-shaped wall of said vent ring having an upper side and a lower side;

said horizontally disposed and ring-shaped wall of said vent ring having a central opening formed therein which communicates with said open lower end of said upstanding ring-shaped wall thereof;

said horizontally disposed and ring-shaped wall of said vent ring having a plurality of radially spaced-apart vent openings formed therein which have upper and lower ends;

said lower side of said vent ring being overmolded with a plastic material which extends across said lower ends of said vent openings;

said plastic overmolding material which extends across said lower ends of said vent openings having a slit formed therein which permits air to pass therethrough while preventing liquid from passing therethrough;

said vent ring being positioned on said upper side of said mounting ring member and being secured thereto whereby the interior of said upstanding ring-shaped wall communicates with said central opening of said mounting ring member;

a hollow, generally cylindrical-shaped accumulator having an open upper end, a bottom wall, and a liquid compartment therein;

said bottom wall of said accumulator having a central opening formed therein which forms an upper valve seat;

said bottom wall of said accumulator having a plurality of openings formed therein outwardly of said upper valve seat;

at least some of said openings in said bottom wall of said accumulator having a hollow vent tube, having upper and lower ends, in communication therewith which extend upwardly within said liquid compartment thereof;

said upper ends of said vent tubes being in communication with at least some of said openings in said bottom wall of said first channel of said mounting ring member;

a dosing bowl having upper and lower ends with a dosing compartment formed therein;

said upper end of said dosing bowl being secured to said accumulator at the lower end thereof so that said dosing compartment is in communication with said upper valve seat in said accumulator and with said openings in said bottom wall of said accumulator;

said lower end of said dosing bowl having a discharge opening and a lower valve seat positioned thereabove;

an actuator selectively vertically movably mounted on said lower end of said dosing bowl which is movable between upper and lower positions with respect thereto;

said actuator having an actuator rod, having upper and lower ends, operatively secured thereto for movement therewith, movable between upper and lower positions, which extends upwardly therefrom through said dosing bowl, said upper valve seat in said bottom wall of said accumulator and said central opening in mounting ring and said central opening in said vent ring for selective engagement with said tricuspid valve;

said actuator rod having first and second vertically spaced valves mounted thereon for movement therewith;

said first valve closing and said upper valve seat when said actuator is in its said upper position and opening said second valve seat when said actuator is in its said lower position;

said first and second valves being vertically spaced on said actuator rod so that said second valve seat is closed before said third valve seat is opened as said actuator rod is moved from its said lower position to its said upper position and so that said third valve seat is closed before said second valve seat is opened as said actuator rod is moved from its said upper position to its said lower position; and an anti-drip valve operatively secured to said dosing bowl for closing said open lower end of said actuator when said actuator is in said lower position.

6. A dispensing and/or dosing system, comprising:

an inverted liquid container having upper and lower ends;

said lower end of said container having a hollow throat extending downwardly therefrom which has interior and exterior surfaces;

said exterior surface of said throat being threaded;
a tricuspid valve, having upper and lower ends, positioned in said throat of said container;
said tricuspid valve being normally closed;
a mounting ring member having upper and lower sides;
said upper side of said mounting ring having first and second upstanding ring-shaped walls, having inner and outer faces formed therein which have upper and lower ends and which have a bottom wall extending therebetween at the lower ends thereof to define a first channel;
said bottom wall of said first channel of said mounting ring having a plurality of radially spaced-apart vent openings formed therein;
said mounting ring having a central opening formed therein inwardly of said inner face of said first wall thereof;
a vent ring having an upper side and a lower side;
said upper side of said vent ring having an upstanding ring-shaped wall which extends upwardly therefrom;
said upstanding ring-shaped wall of said vent ring having interior and exterior sides;
said interior side of said upstanding ring-shaped wall being threaded;
said upstanding ring-shaped wall of said vent ring having an open upper end and an open lower end;
said vent ring includes a horizontally disposed and ring-shaped wall of aid vent ring which extends around said upstanding ring-shaped wall thereof;
said upstanding ring-shaped wall being internally threaded;
said horizontally disposed and ring-shaped wall of said vent ring having an upper side, a lower side and an outer end;
said horizontally disposed and ring-shaped wall of said vent ring having a central opening formed therein which communicates with said open lower end of said upstanding ring-shaped wall thereof;
said horizontally disposed and ring-shaped wall of said vent ring having a plurality of radially spaced-apart vent openings formed therein which have upper and lower ends;
said outer end of said vent ring and said lower side of said vent ring being overmolded with a plastic material which extends across said lower ends of said vent openings;
said plastic overmolding material which extends across said lower ends of said vent openings having a slit formed therein to define a valve which permits air to pass therethrough while preventing liquid from passing therethrough;
said vent ring being positioned on said upper side of said mounting ring member and being secured thereto whereby the interior of said upstanding ring-shaped wall of said vent ring communicates with said central opening of said mounting ring;
a hollow, generally cylindrical-shaped accumulator having an open upper end, a bottom wall, and a liquid compartment therein;
said upper end of said accumulator being secured to said mounting ring;
said bottom wall of said accumulator having a central opening formed therein which forms an upper valve seat;
said bottom wall of said accumulator having at least two vent openings formed therein outwardly of said upper valve seat;
said at least two vent openings in said openings in said bottom wall of said accumulator having a hollow vent tube, having upper and lower ends, in communication therewith which extend upwardly within said liquid compartment thereof;
said upper ends of said vent tubes being in communication with at least some of said openings in said bottom wall of said first channel of said mounting ring;
a dosing bowl having upper and lower ends with a dosing compartment formed therein;
said upper end of said dosing bowl being secured to said accumulator at said lower end thereof so that said dosing compartment is in communication with said upper valve seat in said accumulator and with said vent openings in said bottom wall of said accumulator;
said lower end of said dosing bowl having a discharge opening and a lower valve seat positioned thereabove;
an actuator selectively vertically movably mounted on said lower end of said dosing bowl which is movable between upper and lower positions with respect thereto;
said actuator having a discharge nozzle at its lower end;
said actuator having an actuator rod, having upper and lower ends, operatively secured thereto for movement therewith, which is movable between upper and lower positions, which extends upwardly therefrom through said lower valve seat in said dosing bowl, said upper valve seat in said bottom wall of said accumulator, said central opening in mounting ring and said central opening in said vent ring for selective engagement with said tricuspid valve;
said actuator rod having first and second vertically spaced valves mounted thereon for movement therewith; and
an anti-drip valve operatively secured to said dosing bowl which closes said discharge nozzle when said actuator is in said lower position.

7. The dispensing and/or dosing system of claim 6 wherein an actuator sleeve is positioned in said actuator and which is secured thereto for movement with said actuator and wherein said actuator sleeve slidably embraces said lower end of said dosing bowl and wherein said lower end of said actuator rod is fixed to said actuator sleeve for movement therewith.

* * * * *